United States Patent [19]

Gruber

[11] Patent Number: 5,105,697

[45] Date of Patent: Apr. 21, 1992

[54] MULTIPLE STAGE SHAVING DIE

[76] Inventor: Siegfried F. Gruber, 5624 W. School St., Chicago, Ill. 60634

[21] Appl. No.: 613,379

[22] Filed: Nov. 15, 1990

[51] Int. Cl.$^5$ .......................................... B21D 28/00
[52] U.S. Cl. .................................. 83/98; 83/165; 83/405; 83/681; 83/690; 409/60; 409/275
[58] Field of Search ................. 83/32, 98, 99, 165, 83/405, 681, 682, 690; 409/16, 21, 59, 60, 275, 279; 29/DIG. 94

[56] References Cited

U.S. PATENT DOCUMENTS

| 430,892 | 6/1890 | Shimer | 83/681 |
|---|---|---|---|
| 1,986,793 | 1/1935 | Chapman et al. | 409/59 |
| 3,710,666 | 1/1973 | Keyes et al. | 83/690 X |
| 3,803,977 | 4/1974 | Psenka et al. | 409/60 X |
| 4,443,143 | 4/1984 | Asari et al. | 83/914 X |
| 4,628,780 | 12/1986 | Hicks | 83/98 X |
| 4,970,923 | 11/1990 | Gruber | 83/32 |

Primary Examiner—Hien H. Phan
Assistant Examiner—Raymond D. Woods
Attorney, Agent, or Firm—Patnaude, Batz & Videbeck

[57] ABSTRACT

First and second shaving dies are mounted one above the other and are respectively provided with continuous shaving edges disposed adjacent to contoured annular facial surfaces which draw the shaved material away from the work piece as the shavings are removed by the associated shaving edge. An air nozzle mounted in proximity to the first die directs a jet of air across the contoured facial surface of the first die to blow the removed material away from the first die to prevent its interfering with the operation of the second die. The second die is located directly below the first die and is provided with a plurality of angularly spaced troughs lying immediately adjacent to and below annular facial surfaces on the second die for carrying the shavings from the shaving edges of the second die to a sump located below the second die.

8 Claims, 3 Drawing Sheets

MULTIPLE STAGE SHAVING DIE

The present invention relates in general to a multiple stage shaving die and to a method of shaving a workpiece in a punch press operation, and it relates more particularly to a new and improved method and apparatus which directs the shavings away from the die for collection in a sump incorporated in the associated die set.

BACKGROUND OF THE INVENTION

In copending application Ser. No. 687,777 filed Dec. 31, 1991, now U.S. Pat. No. 4,970,923 there is described an apparatus and process for providing in a punch press operation a precisely dimensioned truly perpendicular side edge on a flat workpiece. In that process, the die has a facial contour located immediately upstream of a continuous shaving edge which draws the shavings away from the workpiece to avoid the establishing of stresses in the workpiece as had been the case in prior art die cutting operations.

While that earlier process has been used successfully in the formation of perpendicular sides on workpieces in punch press operations, it would be desirable to use the same basic process to shave extremely hard metals and still provide precisely dimensioned finished parts which do not require subsequent heat treatment or other flattening operations.

SUMMARY OF THE INVENTION

Briefly, there is provided in accordance with the present invention a new and improved method and apparatus for shaving the side edges of a workpiece in a plurality of steps while removing the shaved material from the die cutting area to maintain the precise dimensional integrity of the part. In the system of the present invention, each of a plurality of shaving dies has a shaving edge adjacent to a contoured facial surface which draws the shavings away from the workpiece, and the shaving dies are stacked one above the other between a plurality of gauge or locator plates respectively positioned above each of the dies to prevent rotation of the workpiece while it is pushed past the shaving edges of the dies.

The first die has a continuous shaving edge, and the associated gauge plate is provided with a slot located gust upstream of the shaving edge of the first die and through which a continuous ring of material removed from the workpiece by the first die is blown away from the first die.

The second die is provided with a plurality of spaced apart shaving edges, and a plurality of troughs are respectively positioned adjacent to the shaving edges. The shavings from the second shaving edges are drawn away from the workpiece by contoured facial surfaces on the upstream side of the die and are deposited in the troughs. The shavings in the trough then fall by gravity into a cartridge or sump mounted below the second die.

GENERAL DESCRIPTION OF THE DRAWINGS

A better understanding of the present invention will be had by reference to the following detailed description taken in connection with the accompanying drawings wherein.

DETAILED DESCRIPTION OF A PREFERRED EMBODIMENT

Figure 1:
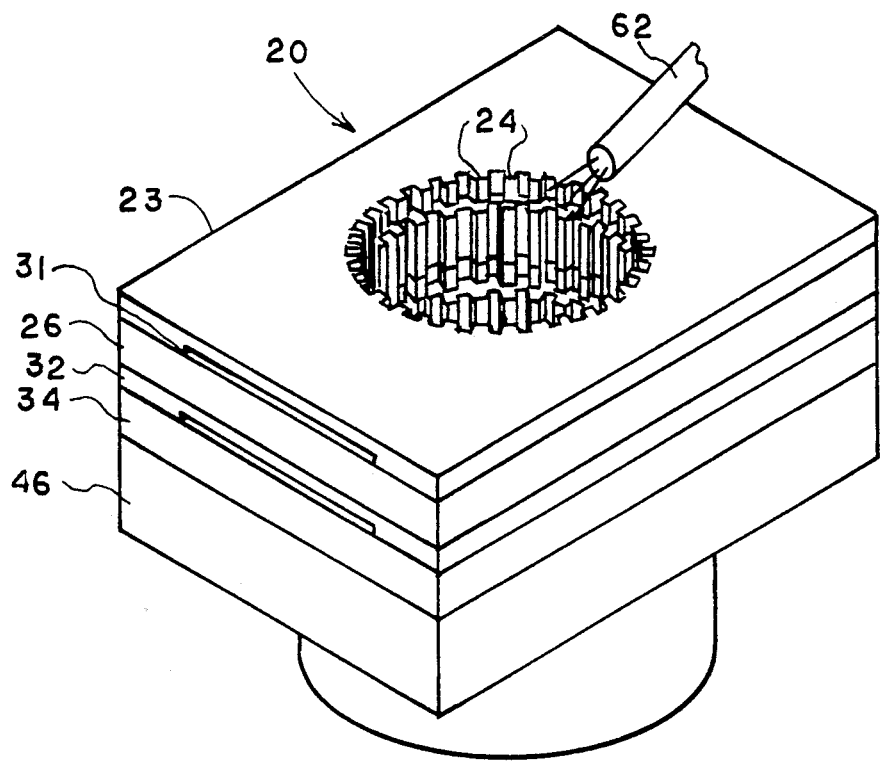
FIG. 1 is an isometric view of a die assembly embodying the present invention.
Figure 2:
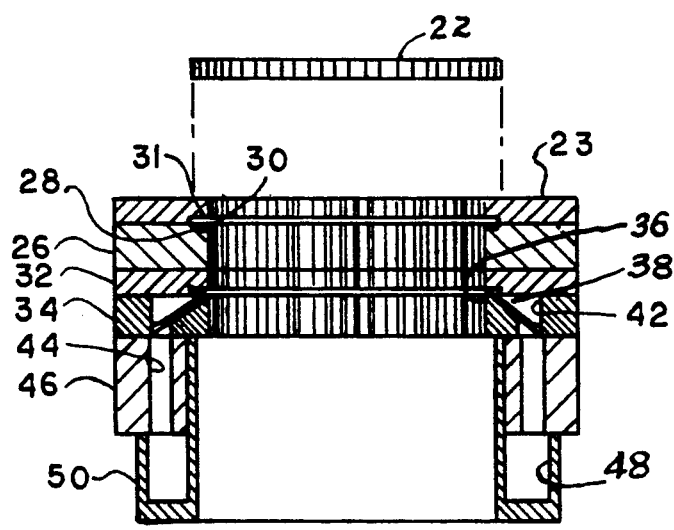
FIG. 2 is a cross-sectional elevational view taken along the vertical center line of FIG. 1.

Referring particularly to FIGS. 1 and 2 there is shown a multiple stage die assembly 20 for shaving the sides of a workpiece 22 having a plurality of radial teeth in the outer edge thereof as the workpiece is pressed downwardly through the die assembly as shown in the drawings. The die assembly 20 comprises a gauge or locator plate 23 having an internal peripheral surface 24 which is generally complementary to the external side edge of the workpiece 22. Mounted directly below and in abutting relationship therewith is a first shaving die 26 having a continuous cutting or shaving edge 28 and an annular trough-like upper surface 30 immediately adjacent to the shaving edge 28 for drawing the metal shaved from the workpiece away from the body of the workpiece.

The gauge plate 23 is provided with a recess 31 located in the lower face thereof directly above the surface 30 to provide a cavity into which the metal removed from the workpiece 22 is drawn by the surface 30 and from which the shaved off metal is removed from the die assembly. As described in more detail hereinafter, a continuous ring of metal is shaved from the workpiece by the cutting edge 28 as the workpiece 22 s pushed downwardly past the die 26.

A second gauge or locator plate 32 is mounted directly below the first shaving die 26, and a second shaving die place 34 is positioned directly below the gauge plate 32. The gauge plate 32 has an annular rabbet 36 located immediately above an annular trough portion 38 on the die plate 34 adjacent a series of cutting edges 30 thereon. As more fully described in connection with FIG. 6, the die plate 34 includes a plurality of passageways 42 which open at the bottom into a plurality of vertical through-holes 44 in a die set or base plate 46. The holes 44 open into an annular chamber 48 forming a sump in a magazine member 50 which is removably attached to the base plate 46.

The second stage cutting die 34 removes metal from the peripheral portions of the workpiece in the form of small chips which are drawn from the workpiece by the surface of the trough 38 and fall by gravity through the passageways 42 and the holes 44 into the chamber 48 where they are collected for subsequent removal from the die assembly.

Figures 3, 4:
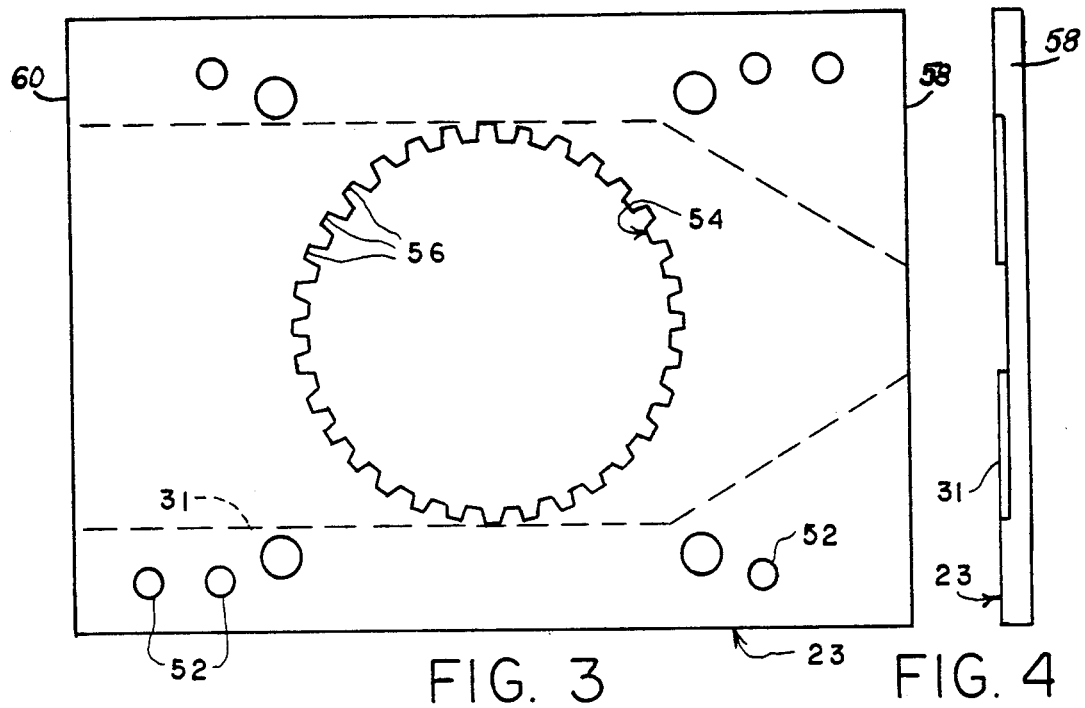
FIG. 3 is a plan view of the upper gauge plate in the assembly of FIG. 1.
FIG. 4 is a front elevational view of the gauge plate of FIG. 3.

Referring particularly to FIGS. 3 and 4, there is shown the gauge plate 23. The plate includes a plurality of through-holes which are adapted to receive a plurality of bolts (not shown) which hold the parts of the die assembly in assembled relationship. A centrally positioned, generally circular opening is provided in the gauge plate 23 and is shaped to conform to the corresponding shape of the workpiece to permit the workpiece to pass freely therethrough but to prevent rotation of the workpiece as it passes through the guide plate. For the purpose of describing the present invention, the workpiece has a plurality of equally spaced teeth, and therefore, the gauge plate 23 has a plurality of equally spaced recesses 56 which correspond in location to the teeth on the workpiece. It may be seen that the recess 31 extends from one side 58 of the gauge plate 23 to the opposite side 60 and has a width dimension substantially greater than the maximum diameter of the opening 54 opening onto the side 60 to permit the ring of metal removed from the periphery of the workpiece to pass therethrough out of he die assembly. In the embodiment of the invention illustrated in FIG. 1, a nozzle 62 is positioned above the die assembly and directs a get of air against the inner edge of the ring of removed metal to push it out of the die assembly through the recess 31 between the lower surface of the gauge plate 23 and the upper surface of the first stage shaving die 26.

Figure 5:
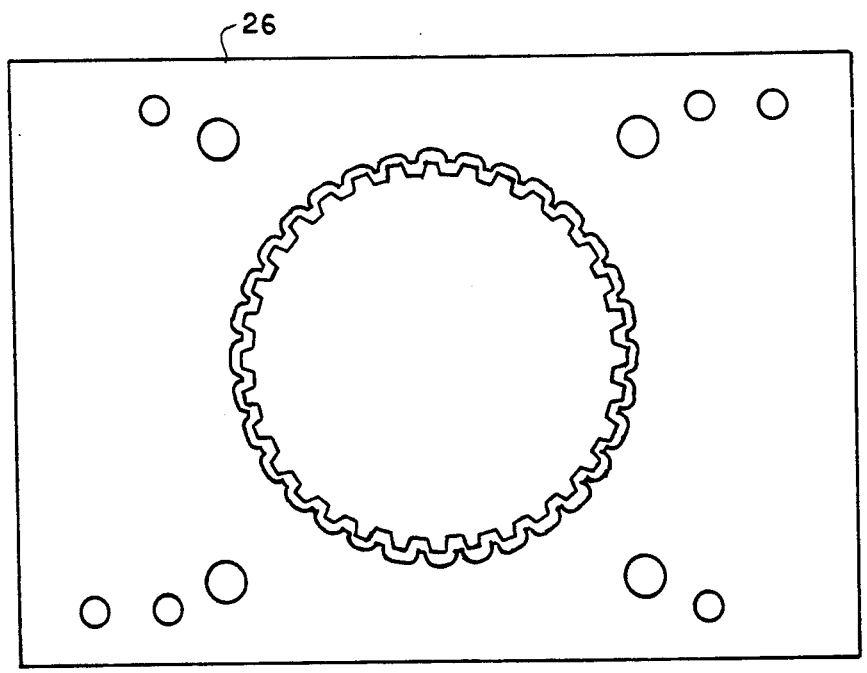
FIG. 5 is a plan view of the first and uppermost die in the assembly of FIG. 1.

Referring to FIG. 5 there is shown a plan view of the first stage shaving die 26 having a plurality of through holes aligned with the holes 52 in the gauge plate 23 for receiving bolts which hold the gauge plates and the die plates in assembled relationship. It will be seen that the cutting edge 28 is substantially complementary to the peripheral configuration of the workpiece. However, the internal dimensions are slightly less than that of the workpiece so that a thin, continuous ring of metal is shaved from the peripheral edge of the workpiece as it is pushed downwardly past the cutting edge 28. Because of the contour of the adjacent annular trough and the fact that the shear angle of the cutting edge is constant throughout the entire continuous cutting edge thereof, the shaved off metal is drawn away from the workpiece as it is shaved therefrom to avoid the establishment of stresses in the workpiece as the metal is shaved therefrom. As explained above, the ring of removed metal is disposed in the trough and the cavity defined by the recess 31 from which it is subsequently removed by a blast of air from the nozzle 62.

Figure 6:
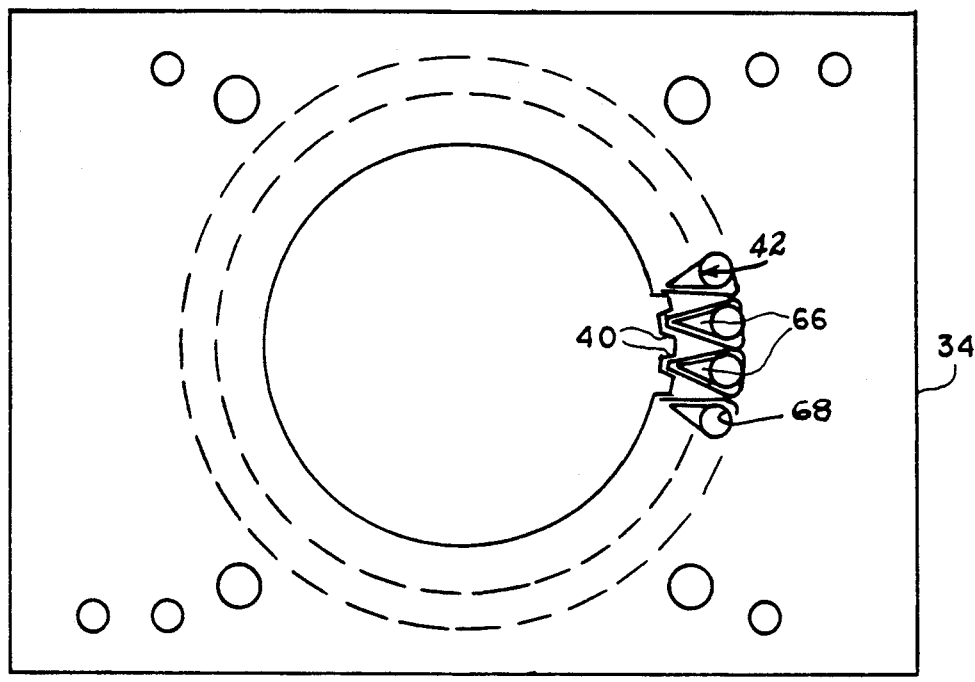
FIG. 6 is a plan view of the second and lowermost die in the assembly of FIG. 1.
Figure 7:
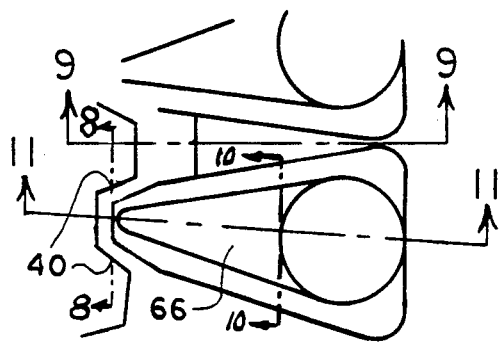
FIG. 7 is an enlarged view of 9 portion of FIG. 6.
Figure 8:
FIG. 8 is a cross-sectional view taken along the line 8—8 of FIG. 7.
Figure 9:
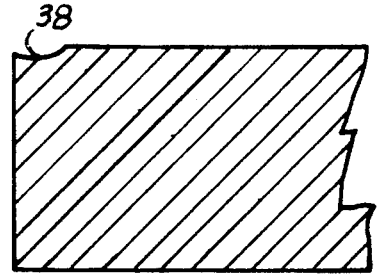
FIG. 9 is a fragmentary cross-sectional view taken along the line 9—9 of FIG. 7.
Figure 11:
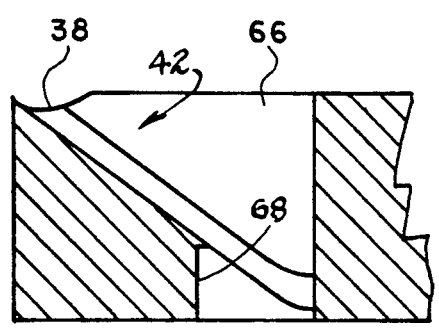
FIG. 11 is a fragmentary cross-sectional view taken along the line 11—11 of FIG. 7.
Figure 10:
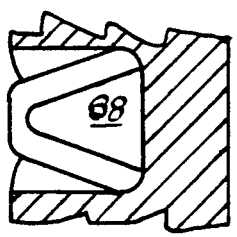
FIG. 10 is a fragmentary across-sectional view taken along the line 10—10 of FIG. 7.

Referring to FIG. 6 it will be seen that the die 34 is provided with a plurality of holes which align with the mounting holes in the othere die and gauge plates. The cutting edge 40 of the second stage shaving die is similar in shape to the cutting edge 28 of the first stage die. However, in the second stage die the sides of the teeth are more closely spaced than are the sides of the teeth on the first stage die while the innermost edges are the same as in the first stage die so that no metal is removed from the bottoms of the spaces between the the teeth of the workpiece by the second stage die. Consequently, metal is removed only from the sides of the teeth and is thus in the form of individual chips rather than as a continuous ring as in the case of the first stage die.

The die 34 is provided with a plurality of troughs 66 on the upper surface thereof immediately adjacent to and outwardly of the cutting edges 40. The troughs extend radially outward from a position below and to the sides of the surfaces 38 to the tops of the holes 44. The die 34 includes cylindrical hole portions 68 at the bottoms of the passageways 42 which are aligned with the holes 44 in the die set 46.

As the workpiece is pushed past the die 34, metal is removed therefrom by the cutting edges 40 in the form of individual chips which are drawn away from the workpiece by the contoured surfaces of the trough 38 and dropped into the troughs 66 from which they flow under the force of gravity into the magazine chamber 48. The magazine 50 may be periodically removed from the die set 46 and emptied of chips before replacement thereof.

While the present invention has been described in connection with a particular embodiment thereof, it will be understood that those skilled in the art may make many changes and modifications without departing from the true spirit and scope of the invention, and therefore, it is intended by the appended claims to cover all such changes and modifications which come within the true spirit and scope thereof.

I claim:

1. A multiple shaving die, comprising in combination first shaving die having first and second opposite sides and having a continuous first cutting edge in proximity to said first side for removing a ring of material from a workpiece as the workpiece is moved past said first cutting edge, second shaving die having a plurality of spaced apart second cutting edges for removing chips from said workpiece as the workpiece is moved past said spaced apart second cutting edges, said second shaving die having a plurality of first passageways respectively disposed in proximity to said spaced apart second cutting edges for transporting said chips away from said second cutting edges, sump means removably mounted to said second shaving die in communication with said first passageways for collecting said chips, said second shaving die being mounted to said first shaving die in a position to shave said chips from said workpiece after said ring of material has been shaved from said workpiece by said first shaving die, a plate mounted to said first side of said first shaving die, a second passageway between said plate and said first side of said first shaving die, and means for pushing said ring of material through said second passageway away from said first shaving die.

2. A multiple shaving die according to claim 1, wherein said means for pushing comprises means for directing a jet of gas against said ring to blow said ring through said second passageway away from said first die.

3. A multiple shaving die according to claim 1, wherein said plurality of second cutting edges are arranged in a first circle, and said plurality of first passageways are troughs arranged in a second circle concentric with said first circle and disposed radially outwardly of said plurality of second cutting edges.

4. A multiple shaving die according to claim 3, comprising a second plate mounted to 9 side of said second shaving die opposite to said first shaving die, said second plate having a plurality of through holes extending between said troughs and said sump.

5. A multiple shaving die according to claim 1, wherein said first shaving die includes an annular trough surrounding said first cutting edge for drawing the ring of material removed from said workpiece by said first cutting edge away from the workpiece.

6. A multiple shaving die according to claim 5, wherein said second shaving die includes a plurality of troughs surrounding said plurality of second cutting edges for removing said chips away from said plurality of second cutting edges.

7. A multiple shaving die according to claim 6, wherein one of said plurality of troughs is provided for every two of said spaced apart second cutting edges.

8. A multiple shaving die according to claim 6, wherein said first shaving die is mounted above said second shaving die, and said sump is mounted below said second shaving die, whereby said chips fall under the force of gravity into said sump.

* * * * *

UNITED STATES PATENT AND TRADEMARK OFFICE
CERTIFICATE OF CORRECTION

PATENT NO. : 5,105,697

DATED : April 21, 1992

INVENTOR(S) : Siegfried F. Gruber

It is certified that error appears in the above-identified patent and that said Letters Patent is hereby corrected as shown below:

In Column 2, at line 11, after "view of" delete "9" and insert --a-- therefor.

In column 2, at line 46, before "pushed" delete "s" and substitute therefor --is--.

In column 2 at line 49, after "die" delete "place".

In column 3 at line 48, after "holes" insert --65--.

In column 4 at line 62 after "mounted to" delete "9" and insert --a-- therefor.

Signed and Sealed this

Twentieth Day of July, 1993

Attest:

MICHAEL K. KIRK

*Attesting Officer*  *Acting Commissioner of Patents and Trademarks*